United States Patent
An et al.

(10) Patent No.: US 10,295,330 B2
(45) Date of Patent: May 21, 2019

(54) METHOD AND SYSTEM FOR MEASURING THICKNESS OF GLASS ARTICLE

(71) Applicant: Corning Incorporated, Corning, NY (US)

(72) Inventors: Chong Pyung An, Painted Post, NY (US); Sang-Mook Lee, Horseheads, NY (US); James Patrick Trice, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/315,527

(22) PCT Filed: Jun. 4, 2015

(86) PCT No.: PCT/US2015/034110
§ 371 (c)(1),
(2) Date: Dec. 1, 2016

(87) PCT Pub. No.: WO2015/187906
PCT Pub. Date: Dec. 10, 2015

(65) Prior Publication Data
US 2017/0122724 A1    May 4, 2017

Related U.S. Application Data

(60) Provisional application No. 62/007,560, filed on Jun. 4, 2014.

(51) Int. Cl.
*G01B 11/06* (2006.01)
*G01B 11/24* (2006.01)
(Continued)

(52) U.S. Cl.
CPC .......... *G01B 11/0658* (2013.01); *G01B 11/06* (2013.01); *G01B 11/0616* (2013.01);
(Continued)

(58) Field of Classification Search
CPC ............ G01B 11/0658; G01B 11/0616; G01B 11/2433; G01B 11/06; G01M 11/02;
(Continued)

(56) References Cited

U.S. PATENT DOCUMENTS 3,737,294 A    6/1973    Sumbaugh, Jr. et al.
3,746,526 A    7/1973    Giffon
(Continued)

FOREIGN PATENT DOCUMENTS

CA    2105464 A1    3/1995
CN    1645039 A    7/2005
(Continued)

OTHER PUBLICATIONS

Ji et al; "Depth Profile From the P/B Ration and the Dependence of the Background Signal on Binding Energy of X-Ray Photoelectron"; Materials Science & Engineering; vol. 20, No. 4; Dec. 2002; 4 Pages.
(Continued)

*Primary Examiner* — Tri T Ton

(57) ABSTRACT

A method includes introducing light into a glass article such that at least a portion of the introduced light is emitted from an edge of the glass article. The light emitted from an edge of the glass article is detected. An intensity profile of the emitted light is an intensity of the emitted light as a function of axial position. A first intensity boundary of the intensity profile and a second intensity boundary of the intensity profile are determined. A thickness of a layer of the glass article is determined based on an axial distance between the first intensity boundary and the second intensity boundary.

13 Claims, 5 Drawing Sheets

(51) Int. Cl.
*G01M 11/08* (2006.01)
*G01M 11/02* (2006.01)
*C03B 33/037* (2006.01)
*C03B 33/07* (2006.01)

(52) U.S. Cl.
CPC ..... *G01B 11/2433* (2013.01); *G01M 11/0285* (2013.01); *G01M 11/081* (2013.01); *C03B 33/037* (2013.01); *C03B 33/07* (2013.01); *C03B 33/076* (2013.01)

(58) Field of Classification Search
CPC ............ G01M 11/0285; G01M 11/081; B65G 2249/02; B65G 49/06; C03C 17/002; G01V 8/10; G01N 21/94; G01N 21/9503; H04L 1/1607; H04L 1/1812; H04L 1/1848; H04L 1/1854; H04L 5/0007; H04L 5/0053; H04L 5/0055; H04L 5/0094; G02F 1/13338; G06F 2203/04103; G06F 3/0412; G06F 3/044; H01L 27/1259; H01L 22/12; C21D 2211/002; C21D 2211/005; C21D 8/0205; C21D 8/0226; C21D 8/10; C21D 8/105; C22C 38/002; C22C 38/02
USPC .... 356/237.1–237.6, 239.1–239.8, 614–640, 356/600–613
See application file for complete search history.

(56) References Cited

U.S. PATENT DOCUMENTS

| | | | |
|---|---|---|---|
| 3,849,097 | A | 11/1974 | Giffen et al. |
| 3,931,438 | A | 1/1976 | Beall et al. |
| 4,102,664 | A | 7/1978 | Dumbaugh, Jr. |
| 4,214,886 | A | 7/1980 | Shay et al. |
| 4,323,785 | A | 4/1982 | McComb et al. |
| 4,532,429 | A | 7/1985 | Horikawa |
| 4,880,453 | A | 11/1989 | Coppola et al. |
| 5,034,613 | A | 7/1991 | Denk et al. |
| 5,342,426 | A | 8/1994 | Dumbaugh, Jr. |
| 5,457,533 | A | 10/1995 | Wilcken |
| 5,498,865 | A | 3/1996 | Gaboury et al. |
| 5,559,060 | A | 9/1996 | Dumbaugh, Jr. et al. |
| 5,604,582 | A | 2/1997 | Rhoads et al. |
| 6,133,999 | A | 10/2000 | Myers et al. |
| 6,683,695 | B1 | 1/2004 | Simpson et al. |
| 6,782,072 | B2 | 8/2004 | Lin |
| 6,962,670 | B1 | 11/2005 | Hanson et al. |
| 7,201,965 | B2 | 4/2007 | Gulati et al. |
| 7,292,745 | B2 | 11/2007 | Dabby |
| 7,514,149 | B2 | 4/2009 | Bocko et al. |
| 7,590,324 | B1 | 9/2009 | Chen et al. |
| 7,638,184 | B2 | 12/2009 | Yaoita et al. |
| 7,776,670 | B2 | 8/2010 | Yamashita et al. |
| 7,876,437 | B1 | 1/2011 | Furnas et al. |
| 7,929,745 | B2 | 4/2011 | Walker et al. |
| 2004/0099823 | A1 | 5/2004 | Abraham et al. |
| 2004/0246493 | A1 | 9/2004 | Kim et al. |
| 2004/0239951 | A1 | 12/2004 | Yamanishi et al. |
| 2006/0127679 | A1 | 6/2006 | Gulati et al. |
| 2007/0002313 | A1 | 4/2007 | Berg et al. |
| 2007/0165206 | A1 | 7/2007 | Olesch et al. |
| 2008/0050756 | A1 | 2/2008 | Paul Kim et al. |
| 2009/0086217 | A1* | 4/2009 | Hayashihara ...... G03G 15/5029 356/630 |
| 2009/0321895 | A1 | 12/2009 | Yamashita et al. |
| 2010/0134615 | A1* | 6/2010 | Akamatsu .......... G01B 11/2433 348/135 |
| 2011/0205540 | A1 | 8/2011 | Moll |
| 2012/0033235 | A1 | 2/2012 | Leipnitz |
| 2012/0060434 | A1 | 3/2012 | Jacobs |
| 2012/0068083 | A1 | 3/2012 | Labrot et al. |
| 2012/0127487 | A1 | 5/2012 | Potapenko |
| 2012/0326055 | A1 | 12/2012 | Wilson et al. |
| 2013/0221237 | A1 | 8/2013 | Logunov |
| 2013/0221238 | A1 | 8/2013 | Li et al. |

FOREIGN PATENT DOCUMENTS

| | | |
|---|---|---|
| DE | 19839363 A1 | 3/2000 |
| FR | 2946336 B1 | 5/2011 |
| JP | 2000221009 A | 8/2000 |
| JP | 03979790 B2 | 9/2007 |
| JP | 4157919 B2 | 10/2008 |
| JP | 2014028730 A | 2/2014 |
| KR | 867197 B1 | 11/2008 |
| WO | 2007020797 A1 | 2/2007 |

OTHER PUBLICATIONS

Measuring Glass Thickness, dated Apr. 15, 2010, pp. 1-2, Designnews.
Meyer; "Gradual Reflection of Short Waves"; Siam J. Appl. Math. vol. 29, No. 3, Nov. 1975; 12 Pages.
International Search Report and Written Opinion of the International Searching Authority; PCT/US2015/034110; dated Aug. 31, 2015; 9 Pages; European Patent Office.
UBM Electronics; Measuring Glass Thickness; Design News; Downloaded Feb. 5, 2013; 2 Pages.
Meyer Gradual Reflection of Short Waves, Siam J. Appl.Math, Nov. 1975, vol. 29, No. 3, pp. 1-12.

* cited by examiner

METHOD AND SYSTEM FOR MEASURING THICKNESS OF GLASS ARTICLE

This application claims the benefit of priority under 35 U.S.C. § 371 of International Application No. PCT/US2015/034110 filed on Jun. 4, 2015, which claims the benefit of priority to U.S. Application No. 62/007,560 filed on Jun. 4, 2014, the content of each of which is incorporated herein by reference in its entirety.

BACKGROUND

This application claims the benefit of priority to U.S. Application No. 62/007,560 filed on Jun. 4, 2014 the content of which is incorporated hereby by reference it its entirety.

1. Field

This disclosure relates to glass Articles, and more particularly to apparatuses and methods for measuring the thickness of glass articles.

2. Technical Background

A glass sheet can be formed using a variety of different processes. The glass sheet can be severed to separate a glass pane therefrom. The glass pane can be processed further (e.g., during a cutting or molding process) to form a shaped glass article.

SUMMARY

Disclosed herein are methods and systems for measuring the thickness of one or more layers of a glass article.

Disclosed herein are methods and systems for measuring a thickness of a glass article.

Disclosed herein is a method comprising introducing light into a glass article such that at least a portion of the introduced light is emitted from an edge of the glass article. The light emitted from the edge of the glass article is detected. An intensity profile of the emitted light comprises an intensity of the emitted light as a function of axial position. A first intensity boundary of the intensity profile and a second intensity boundary of the intensity profile are determined. A thickness of a layer of the glass article is determined based on an axial distance between the first intensity boundary and the second intensity boundary.

Also disclosed herein is a method comprising: (a) introducing light into a glass article; (b) detecting light emitted from an edge of the glass article; and (c) determining an axial position of an intensity boundary of an intensity profile of the emitted light. The intensity profile of the emitted light comprises an intensity of the emitted light as a function of axial position. Steps (b) and (c) are repeated at a plurality of different transverse positions along the edge of the glass article to determine axial positions of a plurality of intensity boundaries corresponding to the different transverse positions. A layer boundary between adjacent first and second layers of the glass article is determined based on the plurality of intensity boundaries.

Also disclosed herein is a method comprising detecting light emitted from an edge of a glass article. A thickness of a layer of the glass article is determined based on a distance between a first intensity boundary and a second intensity boundary of the emitted light.

Also disclosed herein is a system comprising a light source configured to introduce light into a glass article. A light detector is configured to detect light emitted from an edge of the glass article. An intensity profile of the emitted light comprises an intensity of the emitted light as a function of axial position. A processing unit is configured to determine a first intensity boundary of the intensity profile and a second intensity boundary of the intensity profile, and to determine a thickness of a layer of the glass article based on an axial distance between the first intensity boundary and the second intensity boundary.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
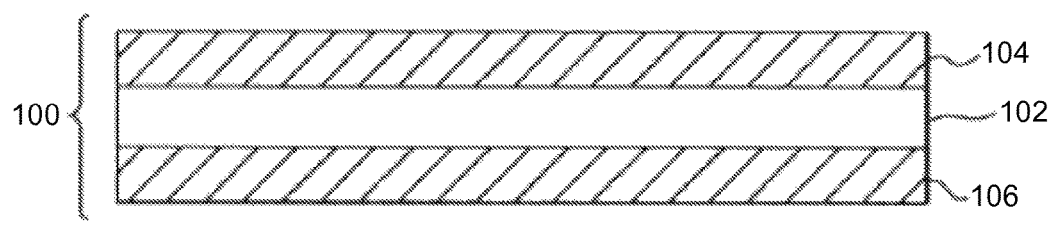
FIG. 1 is a schematic cross-sectional view of one exemplary embodiment of a glass structure.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

In various embodiments, a glass article comprises at least a first layer and a second layer. For example, the first layer comprises a core layer, and the second layer comprises one or more cladding layers adjacent to the core layer. The first layer and/or the second layer are glass layers comprising a glass, a glass-ceramic, or a combination thereof. In some embodiments, the first layer and/or the second layer are transparent glass layers.

In various embodiments, a thickness measurement system is used to measure a thickness of at least one layer of a glass article. Light is introduced into the glass article by a light source. The light propagates through the glass article and at least a portion of the light is emitted from an edge of the glass article. The light emitted from the edge of the glass article is detected by a light detector. An intensity profile of the detected light is analyzed by a processing unit to determine a plurality of intensity boundaries, and the thickness of at least one layer of the glass article is determined based on the plurality of intensity boundaries.

FIG. 1 is a schematic cross-sectional view of one exemplary embodiment of a glass structure. The glass structure comprises a laminated glass structure comprising a plurality of glass layers. A glass article comprises the glass structure. In some embodiments, the glass article comprises a glass sheet 100 comprising the glass structure. Thus, glass sheet 100 comprises a laminated sheet comprising a plurality of glass layers. The laminated sheet can be substantially planar as shown in FIG. 1 or non-planar. Glass sheet 100 comprises a core layer 102 disposed between a first cladding layer 104 and a second cladding layer 106. In some embodiments, first cladding layer 104 and second cladding layer 106 are exterior layers as shown in FIG. 1. In other embodiments, the first cladding layer and/or the second cladding layer are intermediate layers disposed between the core layer and an exterior layer.

Core layer 102 comprises a first major surface and a second major surface opposite the first major surface. In some embodiments, first cladding layer 104 is fused to the first major surface of core layer 102. Additionally, or alternatively, second cladding layer 106 is fused to the second major surface of core layer 102. In such embodiments, the interfaces between first cladding layer 104 and core layer 102 and/or between second cladding layer 106 and core layer 102 are free of any bonding material such as, for example, an adhesive, a coating layer, or any non-glass material added or configured to adhere the respective cladding layers to the core layer. Thus, first cladding layer 104 and/or second cladding layer 106 are fused directly to core layer 102 or are directly adjacent to core layer 102. In some embodiments, the glass sheet comprises one or more intermediate layers disposed between the core layer and the first cladding layer and/or between the core layer and the second cladding layer. For example, the intermediate layers comprise intermediate glass layers and/or diffusions layers formed at the interface of the core layer and the cladding layer (e.g., by diffusion of one or more components of the core and cladding layers into the diffusion layer). In some embodiments, glass sheet 100 comprises a glass-glass laminate (e.g., an in situ fused multilayer glass-glass laminate) in which the interfaces between directly adjacent glass layers are glass-glass interfaces.

In some embodiments, core layer 102 comprises a first glass composition, and first and/or second cladding layers 104 and 106 comprise a second glass composition that is different than the first glass composition. For example, in the embodiment shown in FIG. 1, core layer 102 comprises the first glass composition, and each of first cladding layer 104 and second cladding layer 106 comprises the second glass composition. In other embodiments, the first cladding layer comprises the second glass composition, and the second cladding layer comprises a third glass composition that is different than the first glass composition and/or the second glass composition.

In some embodiments, a refractive index of the first glass composition of core layer 102 is different than a refractive index of the second glass composition of first cladding layer 104 and/or second cladding layer 106. For example, the refractive index of the first glass composition differs from the refractive index of the second glass composition by at least about 0.001. The refractive index difference between core layer 102 and first cladding layer 104 and/or second cladding layer 106 enables glass sheet 100 to act as a waveguide (e.g., a planar waveguide). Thus, light can be introduced into glass sheet 100 and emitted from an edge of the glass sheet as described herein.

In some embodiments, the intensity of the light emitted from the edge of glass sheet 100 is non-uniform in an axial direction as described herein. For example, as the light propagates through glass sheet 100, the light tends to concentrate in the layer comprising the glass composition with the higher refractive index. In some embodiments, the first glass composition has a higher refractive index than the second glass composition. Thus, the light propagating through glass sheet 100 tends to concentrate in core layer 102, and the intensity of the light emitted from the edge of the core layer is higher than the intensity of the light emitted from the edge of first cladding layer 104 and/or second cladding layer 106 as described herein. In other embodiments, the second glass composition has a higher refractive index than the first glass composition. Thus, the light propagating through the glass sheet tends to concentrate in the first cladding layer and/or the second cladding layer, and the intensity of the light emitted from the edge of the first cladding layer and/or the second cladding layer is higher than the intensity of the light emitted from the edge of the core layer. The intensity difference between the light emitted from the edges of the core layer, the first cladding layer, and/or the second cladding layer can be used to determine the thicknesses of the layers as described herein.

In some embodiments, glass sheet 100 comprises a thickness of at least about 0.05 mm, at least about 0.1 mm, at least about 0.2 mm, or at least about 0.3 mm. Additionally, or alternatively, glass sheet 100 comprises a thickness of at most about 3 mm, at most about 2 mm, at most about 1.5 mm, at most about 1 mm, at most about 0.7 mm, or at most about 0.5 mm. In some embodiments, a ratio of a thickness of core layer 102 to a thickness of glass sheet 100 is at least about 0.8, at least about 0.85, at least about 0.9, or at least about 0.95. In some embodiments, a thickness of the second layer (e.g., each of first cladding layer 104 and second cladding layer 106) is from about 0.01 mm to about 0.3 mm.

Although glass sheet 100 shown in FIG. 1 comprises three layers, other embodiments are included in this disclosure. In other embodiments, a glass sheet can comprise a determined number of layers, such as one, two, four, or more layers. Different layers can comprise the same or different glass compositions.

Although the glass article is described with reference to glass sheet 100, other embodiments are included in this disclosure. In other embodiments, the glass article comprises a shaped glass article comprising a non-planar 3-dimensional shape. For example, the shaped glass article can be formed by shaping a glass sheet, such as glass sheet 100, using a suitable reforming process. Thicknesses of different glass layers of the glass article can be determined based on differences in the intensity of light emitted from the different layers at an edge of the glass article as described herein with reference to glass sheet 100.

Glass sheet 100 can be formed using a suitable process such as, for example, a fusion draw, down draw, slot draw, up draw, or float process. In some embodiments, glass sheet 100 is formed using a fusion draw process. For example, glass sheet 100 is formed using an overflow distributor configured as described in U.S. Pat. No. 4,214,886, which is incorporated herein by reference in its entirety.

Figure 4:
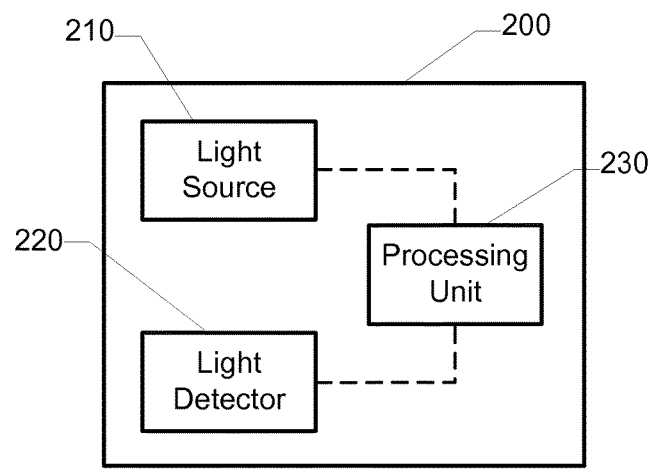
FIG. 4 is a block diagram of the thickness measurement system of FIGS. 2-3.
Figure 2:
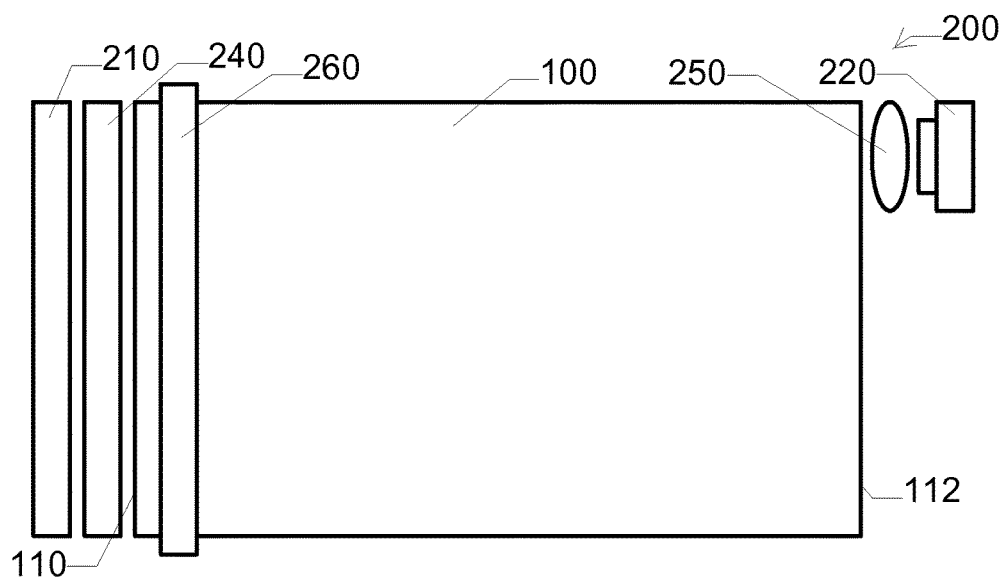
FIG. 2 is a front view of one exemplary embodiment of a thickness measurement system.
Figure 3:
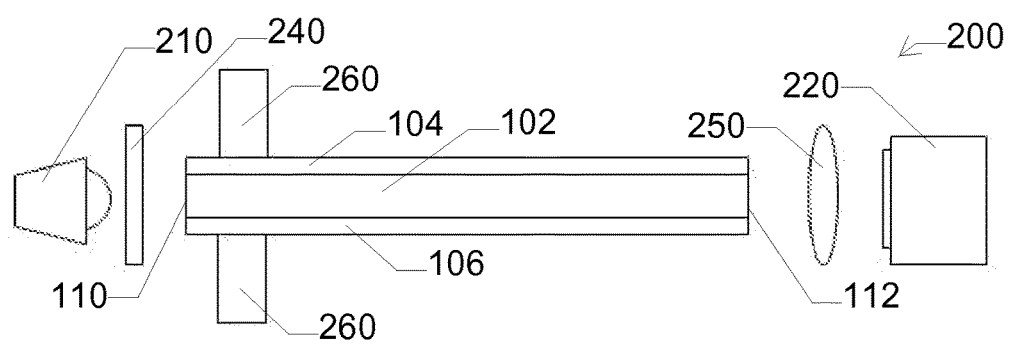
FIG. 3 is a side view of the thickness measurement system of FIG. 2.

FIGS. 2 and 3 are front and side views, respectively, of one exemplary embodiment of a thickness measurement system 200 that can be used to measure a thickness of one or more layers of a glass article such as, for example, glass sheet 100; and FIG. 4 is a block diagram of thickness measurement system 200. Thickness measurement system 200 comprises a light source 210 that is configured to introduce light into the glass sheet. The light propagates through the glass sheet and at least a portion of the light is emitted from an edge of the glass sheet. Thickness measurement system 200 comprises a light detector 220 that is configured to detect the light emitted from the edge of the glass sheet and to generate an intensity image of the detected light. In some embodiments, thickness measurement system 200 comprises a processing unit 230 that is configured to analyze the intensity image of the detected light. For example, processing unit 230 is configured to determine an intensity profile of the detected light based on the intensity image and/or to determine one or more intensity boundaries of the intensity profile as described herein.

Light source 210 comprises a suitable light element such as, for example, a laser, a light emitting diode (LED), an organic light emitting diode (OLED), a fluorescent light, an incandescent light, or combinations thereof. In some embodiments, light source 210 emits white light (e.g., light comprising wavelengths from about 390 nm to about 700 nm), which can aid in reducing the cost of the light source compared to light sources that emit other wavelengths of light. Additionally, or alternatively, light source 210 emits non-collimated or diffuse light, which can aid in reducing the cost of the light source compared to light sources (e.g., lasers) that emit collimated light.

In the embodiment shown in FIGS. 2-3, light source 210 comprises an elongate light bar. For example, the light bar extends in a transverse direction to introduce light into glass sheet 100 along the width of the glass sheet. The light bar can comprise a plurality of light elements disposed along the width of the light bar.

In some embodiments, thickness measurement system 200 comprises a diffuser 240. For example, diffuser 240 is positioned between light source 210 and glass sheet 100 as shown in FIGS. 2-3. Diffuser 240 can be separate from or integral with light source 210. For example, the diffuser can comprise a filter or a lens positioned at a front surface of the light source. Diffuser 240 is configured to diffuse the light introduced into glass sheet 100 by light source 210. For example, diffuser 240 comprises a lens or filter that scatters light passing through the diffuser. Diffuser 240 comprises a suitable diffusing material such as, for example, fused silica ground glass, holographic diffuser material, light shaping diffuser material, ground polycarbonate, or combinations thereof. Diffuser 240 diffuses or scatters the light emitted by light source 210 so that the light introduced into glass sheet 100 comprises diffused light. The diffused light is introduced into glass sheet 100 at arbitrary angles. In some embodiments, the diffused light is introduced into glass sheet 100 at a uniformly distributed angle. For example, the intensity of the diffused light is substantially uniform in the transverse direction and/or the axial direction. Introducing diffused light into glass sheet 100 can increase the light transition between the various layers of glass sheet 100. For example, introducing diffused light into glass sheet 100 can aid in directing light toward the interfaces between adjacent layers (as opposed to propagating through one layer without contacting an interface) and concentrating the light within the layer with the higher refractive index.

Light detector 220 comprises a suitable image sensor such as, for example, a semiconductor charge coupled device (CCD) sensor, a complementary metal oxide semiconductor (CMOS) sensor, an N-type metal oxide semiconductor (NMOS) sensor, or combinations thereof. In some embodiments, light detector 220 comprises a camera comprising the image sensor.

In some embodiments, thickness measurement system 200 comprises an optical unit 250. For example, optical unit 250 is positioned between glass sheet 100 and light detector 220 as shown in FIGS. 2-3. Optical unit 250 can be separate from or integral with light detector 220. For example, the thickness measurement system can comprise a camera comprising the light detector and the optical unit. Optical unit 250 is configured to focus the light emitted from the edge of glass sheet 100 on light detector 220. For example, optical unit 250 comprises one or more lenses positioned to focus the light emitted from the edge of glass sheet 100 on light detector 220.

In some embodiments, thickness measurement system 200 comprises a light blocking unit 260. For example, light blocking unit 260 is positioned between light source 210 and light detector 220 as shown in FIGS. 2-3. Light blocking unit 260 is configured to shield light detector 220 from ambient light that is not emitted from the edge of glass sheet 100. For example, some of the light emitted by light source 210 is directed away from glass sheet 100 as opposed to being introduced into the glass sheet. Light blocking unit 260 can aid in absorbing or reflecting the light that is not introduced into glass sheet 100 so that such light is not detected by light detector 220. In some embodiments, light blocking unit 260 comprises a light blocking bar. For example, the light blocking bar is positioned adjacent to a surface of glass sheet 100 and extends in a transverse direction to block light along the width of the glass sheet. In some embodiments, light blocking unit 260 comprises a first light blocking unit positioned adjacent to a first surface of glass sheet 100 and a second light blocking unit positioned adjacent to a second surface of the glass sheet opposite the first surface as shown in FIGS. 2-3. Thus, light blocking unit 260 can block light that is directed away from either surface of glass sheet 100. In some embodiments, each of the first light blocking unit and the second light blocking unit comprises a light blocking bar. Glass sheet 100 can be clamped between the first light blocking unit and the second light blocking unit, which can aid in holding the glass sheet in place for measuring the thickness of one or more layers of the glass sheet.

In some embodiments, the thickness measurement system comprises one or more auxiliary light sources positioned between the light blocking unit and the light detector. The auxiliary light source is directed at a point on the surface of the glass sheet near the edge from which light is emitted. For example, the auxiliary light source is angled inward toward the surface of the glass sheet and directed at a point near the edge of the glass sheet adjacent to the light detector. Light from the auxiliary light source contacts the glass sheet and scatters. A portion of the scattered light is detected by the light detector, which can aid in improving the contrast at the interface between the glass sheet and the ambient atmosphere (e.g., the air). The auxiliary light source can be used when the cladding layer absorbs light (e.g., when the cladding layer is dark clad) to aid in forming a surface boundary at the interface.

Processing unit 230 comprises a suitable processor such as, for example, a general processor, a digital signal processor, an application specific integrated circuit, a field programmable gate array, an analog circuit, a digital circuit, a server processor, or combinations thereof. Processing unit 230 can be configured as a single device or a combination of devices, such as associated with a network or distributed processing. Processing unit 230 is configured to implement a suitable processing strategy such as, for example, multi-processing, multi-tasking, parallel processing, remote processing, centralized processing, or combinations thereof. Processing unit 230 can be responsive to or operable to execute instructions stored as part of software, hardware, integrated circuits, firmware, microcode, or combinations thereof. For example, processing unit 230 is configured to control components of thickness measurement system 200 (e.g., light source 210 and/or light detector 220). In some embodiments, processing unit 230 comprises a memory (e.g., ROM and/or RAM), a storage device (e.g., a hard drive, a flash drive, a CD-ROM, and/or a DVD), a user input device (e.g., a keyboard, a mouse, and/or a touch-screen), an output device (e.g., a display and/or a light), an input/output device (e.g., a network card and/or a serial bus), an operating system (e.g., a Microsoft Windows operating system), an application program and data, or combinations thereof.

The light introduced into the glass sheet can be polarized (e.g., linear or circular polarized) or non-polarized light. Similarly, the light detected by the light detector can be polarized (e.g., linear or circular polarized) or non-polarized light. Thus, thickness measurement system 200 can comprise one or more polarizers positioned near the light source and/or the light detector.

In some embodiments, light source 210 is positioned adjacent to a first edge 110 of glass sheet 100 as shown in FIGS. 2-3 to introduce light into the first edge. The light propagates through glass sheet 100 and is emitted from a second edge 112 of the glass sheet opposite first edge 110. Light detector 220 is positioned adjacent to second edge 112 of glass sheet 100 to detect light emitted from the second edge and to generate an intensity image of the detected light. As shown in FIG. 4, processing unit 230 is operatively coupled to light detector 220 to receive image data comprising the intensity image of the detected light. Processing unit 230 is configured to determine an intensity profile of the detected light based on the image data and to analyze the intensity profile to determine one or more intensity boundaries of the intensity profile.

Figure 5:
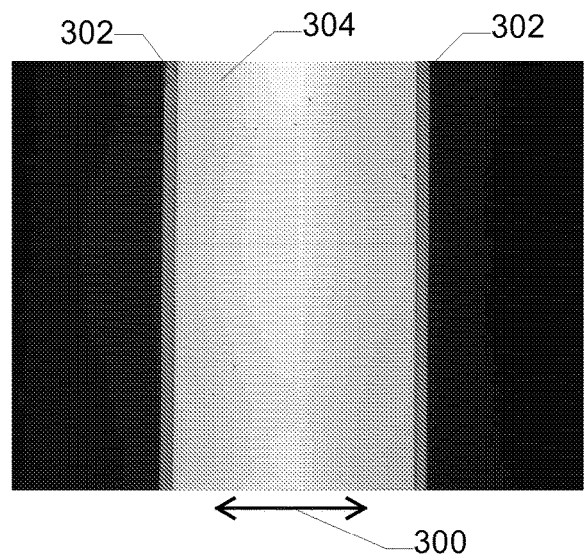
FIG. 5 is one exemplary embodiment of an intensity image.

In some embodiments, the intensity of the emitted light varies in an axial direction extending substantially parallel to a thickness of glass sheet 100 at the edge of the glass sheet. For example, the axial direction is substantially perpendicular to a first major surface and/or a second major surface of the glass sheet. Thus, in embodiments in which the glass sheet is planar, the axial direction is perpendicular to the plane of the glass sheet. FIG. 5 illustrates one exemplary embodiment of an intensity image generated by light detector 220 in response to detecting the light emitted from edge 112 of glass sheet 100. The axial direction is represented in FIG. 5 by an arrow 300. As shown in FIG. 5, the intensity of the light emitted from the edge of core layer 102 is greater than the intensity of the light emitted from the edges of first cladding layer 104 and second cladding layer 106 (e.g., because the refractive index of the first glass composition of the core layer is greater than the refractive index of the first cladding layer and the second cladding layer). The difference in intensity is illustrated by the relatively dark regions 302 corresponding to first cladding layer 104 and second cladding layer 106 and the relatively bright region 304 corresponding to core layer 102.

The waveguide effect of the glass sheet can be modeled to show propagation of light within glass sheet 100. The model compares the difference in index of refraction of the different glass layers to the resulting contrast difference in the light emitted from the edges of the different layers. Thus, the model is used to determine the level of intensity contrast based on the index of refraction difference, which can enable selection of a suitable image sensor for detecting the contrast difference.

Figure 6:
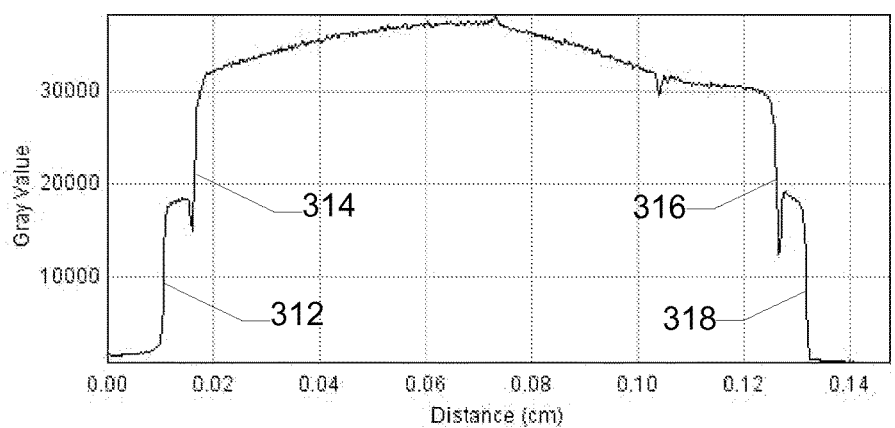
FIG. 6 is a graphical representation of an intensity profile corresponding to the intensity image of FIG. 5.

An intensity profile of the emitted light comprises an intensity of the emitted light as a function of axial position along the edge of the glass sheet. FIG. 6 is a graphical representation of the intensity profile of the emitted light corresponding to the intensity image shown in FIG. 5. In the embodiment shown in FIG. 6, the x-axis represents axial position, and the y-axis represents intensity of the emitted light. The thicknesses of core layer 102, first cladding layer 104, and/or second cladding layer 106 can be determined based on the intensity profile.

In some embodiments, an intensity boundary of the intensity profile is determined. For example, processing unit 230 analyzes the intensity profile and determines the intensity boundary. The intensity boundary comprises a change in intensity of the detected light indicative of a boundary between materials having different refractive indices. For example, the intensity boundary comprises a sufficiently large change in intensity over a sufficiently small axial distance to indicate a boundary between materials having different refractive indices. In some embodiments, the intensity boundary comprises a surface boundary indicative of a boundary between air and a glass material. Thus, the surface boundary is indicative of a surface of glass sheet 100. Additionally, or alternatively, the intensity boundary comprises an intermediate boundary indicative of a boundary between glass materials having different refractive indices (e.g., the first glass composition and the second glass composition). Thus, the intermediate boundary is indicative of an interface between adjacent layers of glass sheet 100. In the embodiment shown in FIG. 6, the intensity boundary comprises a first surface boundary 312, a first intermediate boundary 314, a second intermediate boundary 316, and a second surface boundary 318.

In some embodiments, the thickness of a layer of the glass sheet is determined based on the intensity boundaries of the intensity profile. For example, a thickness of a layer of the glass sheet is determined based on an axial distance between adjacent intensity boundaries. In some embodiments, processing unit 230 determines the axial distance between directly adjacent intensity boundaries and calculates the thickness of the layer of the glass sheet. In the embodiment shown in FIG. 6, the thickness of first cladding layer 104 is determined based on the axial distance between first surface boundary 312 and first intermediate boundary 314. Additionally, or alternatively, the thickness of core layer 102 is determined based on the axial distance between first intermediate boundary 314 and second intermediate boundary 316. Additionally, or alternatively, the thickness of second cladding layer 106 is determined based on the axial distance between second intermediate boundary 316 and second surface boundary 318. Thus, the thickness of each layer of the glass sheet is related to (e.g., proportional to or equal to) the axial distance between the adjacent intensity boundaries corresponding to the layer.

In some embodiments, the glass sheet comprises a diffusion layer between adjacent glass layers. Thus, the intensity boundary comprises a first diffusion boundary between one glass layer and the diffusion layer and a second diffusion boundary between the adjacent glass layer and the diffusion layer. The diffusion boundary can have a thickness, for example, of about 3 μm to about 20 μm. In some embodiments, the intermediate boundary between the adjacent glass layers is between the first diffusion boundary and the second diffusion boundary. Thus, a portion of the diffusion layer is considered to be comprised in each of the adjacent glass layers. In other embodiments, one of the first diffusion boundary or the second diffusion boundary is used as the intermediate boundary. Thus, the diffusion layer is considered to be comprised in one of the adjacent glass layers. In other embodiments, the each of the first diffusion boundary and the second diffusion boundary is used as an intermediate boundary. Thus, the diffusion layer is considered to be a separate layer disposed between the adjacent glass layers. For example, the thickness of the diffusion layer can be determined as described herein separately from either of the adjacent glass layers. In various embodiments, the thickness measurement system can be used to determine the thicknesses of different layers (e.g., glass layers and/or diffusion layers) even though the glass composition various gradually between adjacent glass layers.

The intensity image of the emitted light shown in FIG. 5 and the intensity profile of the emitted light shown in FIG. 6 correspond to a particular transverse position along second edge 112 of glass sheet 100. Thus, the thicknesses determined based on the intensity profile correspond to the particular transverse position. The transverse position is a position in a transverse direction extending substantially parallel to second edge 112 of glass sheet 100. For example, the transverse direction is substantially perpendicular to the axial direction.

In some embodiments, a thickness profile of a layer of the glass sheet is determined. The thickness profile comprises the thickness of the layer of the glass sheet as a function of transverse position along the edge of the glass sheet. For example, the thickness profile of the layer is determined by repeating the process described herein (e.g., detecting light emitted from the edge of the glass sheet, determining an intensity boundary of an intensity profile of the detected light, and determining the thickness of the layer based on the intensity boundary) at a plurality of different transverse positions along the edge of the glass sheet. In some embodiments, the directly adjacent transverse positions are spaced from one another by a distance from about 1 mm to about 10 mm.

Figure 7:
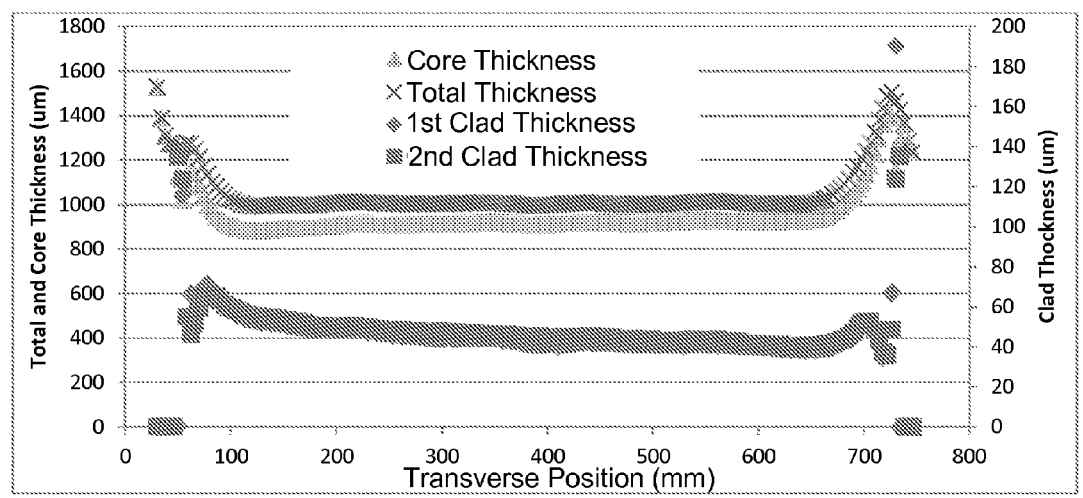
FIG. 7 is a graphical representation of a thickness profile of each layer of one exemplary embodiment of a glass article.

In some embodiments, the thickness profile of each of a plurality of layers is determined. For example, FIG. 7 is a graphical representation of the thickness profile of each of first cladding layer 104, core layer 102, and second cladding layer 106 of glass sheet 100. In the embodiment shown in FIG. 7, the x-axis represents transverse position, and the y-axis represents the thickness of the respective layer. In some embodiments, glass sheet 100 comprises a bead positioned at each longitudinal edge. For example, the beads extend in a longitudinal direction that is substantially perpendicular to the transverse direction. The beads comprise regions of glass sheet 100 that are thicker than a central region of the glass sheet disposed between the beads. As shown in FIG. 7, the methods and systems described herein are capable of determining the thickness of one or more layers of glass sheet 100 at the beads and at the central region of the glass sheet.

In some embodiments, light detector 220 is moved in the transverse direction along second edge 112 of glass sheet 100. For example, light detector 220 is mounted on a rail or a movable carriage to enable the light detector to be moved relative to glass sheet 100. Thus, light detector 220 scans along second edge 112 of glass sheet 100. Movement of light detector 220 relative to glass sheet 100 can be caused by moving the light detector and maintaining the glass sheet stationary, moving the glass sheet and maintaining the light detector stationary, or moving both the light detector and the glass sheet. The light emitted from second edge 112 is detected at a plurality of different transverse positions along the edge of glass sheet 100. An intensity image of the detected light is generated at the plurality of different transverse positions. Intensity boundaries of the intensity profile of the detected light are determined at the plurality of different transverse positions. In some embodiments, a layer boundary is determined based on a plurality of intensity boundaries corresponding to the plurality of different transverse positions. The layer boundary comprises a surface layer boundary between air and a layer of the glass sheet or an intermediate layer boundary between adjacent layers of the glass sheet. In some embodiments, the thickness of one or more layers of the glass sheet is determined at the plurality of different transverse positions based on the intensity boundaries of the intensity profile. Additionally, or alternatively, the thickness profile of one or more layers of the glass sheet is determined based on the layer boundary. In some embodiments, processing unit 230 is operatively coupled to light detector 220 as shown in FIG. 4 to control movement of the light detector relative to glass sheet 100.

In some embodiments, light detector 220 is stopped and focused on the edge of glass sheet 100 at each of the plurality of different transverse positions, In other embodiments, light detector 220 scans continuously along the edge of glass sheet 100 without being stopped to focus. Focusing light detector 220 can comprise detecting a distance between the light detector and the glass sheet and adjusting the light detector or optical unit 250 based on the detected distance and/or adjusting the light detector and/or the optical unit until a clear image is determined (e.g., until an intensity boundary is clearly defined).

In some embodiments, the edge of glass sheet 100 is non-perpendicular with respect to light detector 220. For example, the edge of glass sheet 100 is a severed edge comprising imperfections (e.g., chips or cracks). In some embodiments, light detector 220 is focused on a first axial portion of the edge (e.g., at a first surface of the glass sheet) while a first image is captured, and focused on a second axial portion of the edge (e.g., a second surface of the glass sheet) while a second image is captured. Each intensity boundary can be in focus in at least one of the images captured by light detector 220.

In some embodiments, the light detector comprises multiple light detectors positioned along the edge of the glass sheet. Additionally, or alternatively, the optical unit comprises multiple optical units positioned along the edge of the glass sheet. Using multiple light detectors and/or optical units can increase the speed of the thickness measurement system by enabling the thickness to be determined at multiple transverse positions simultaneously.

In some embodiments, light source 210 is moved during the detecting light emitted from the edge of glass sheet 100. For example, light source 210 is moved relative to glass sheet 100 in the axial direction (e.g., by translation and/or rotation) while the light emitted from the edge of the glass sheet is detected. Movement of light source 210 relative to glass sheet 100 can be caused by moving the light source and maintaining the glass sheet stationary, moving the glass sheet and maintaining the light source stationary, or moving both the light source and the glass sheet. In some embodiments, light source 210 oscillates in the axial direction. Such movement of light source 210 can aid in dispersing the light introduced into glass sheet 100 and directing the light toward the interfaces between adjacent glass layers. In some embodiments, processing unit 230 is operatively coupled to light source 210 as shown in FIG. 4 to control movement of the light source relative to glass sheet 100.

Figure 8:
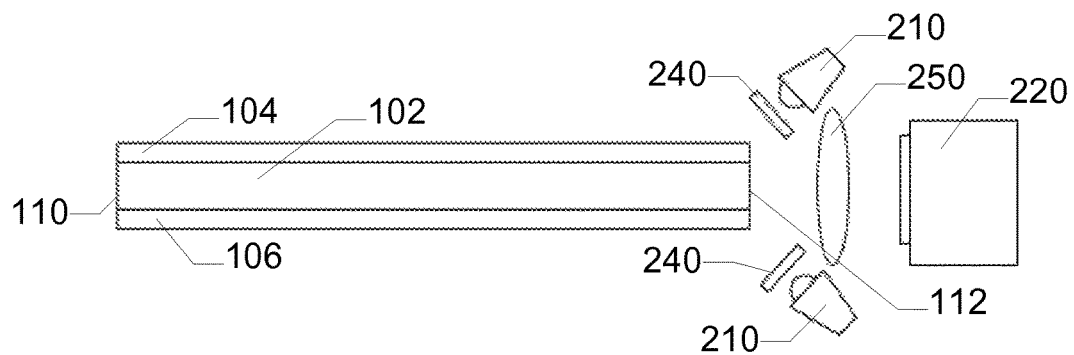
FIG. 8 is a side view of another exemplary embodiment of a thickness measurement system.

FIG. 8 illustrates another exemplary embodiment of a thickness measurement system 200a. Thickness measurement system 200a is similar to thickness measurement system 200 described herein with reference to FIGS. 2-4. For example, in the embodiment shown in FIG. 8, thickness measurement system 200a comprises light source 210 configured to introduce light into glass sheet 100 and light detector 220 configured to detect light emitted from second edge 212 of glass sheet 100. In some embodiments, thickness measurement system 200a comprises diffuser 240 configured to diffuse the light introduced into glass sheet 100 by light source 210. Additionally, or alternatively, thickness measurement system 200a comprises optical unit 250 configured to focus the light emitted from second edge 212 of glass sheet 100 onto light detector 220. In the embodiment shown in FIG. 8, light source 210 is positioned adjacent to a surface of glass sheet 100. Thus, light source 210 is configured to introduce light into the surface of glass sheet 100 as opposed to introducing light into an edge of the glass sheet.

In some embodiments, light source 210 is directed away from light detector 220 as shown in FIG. 8. For example, light source 210 is positioned between glass sheet 100 and light detector 220 and directed at an angle away from the light detector and toward the glass sheet. Such a configuration can aid in reducing the amount of light generated by light source 210 that reaches light detector 220 without first passing through glass sheet 100. The light introduced into glass sheet 100 by light source 210 propagates through the glass sheet and is emitted from second edge 112 as described herein with reference to thickness measurement system 200. In some embodiments, light source 210 comprises two light sources positioned on opposite sides of glass sheet 100 as shown in FIG. 8. Thus, light is introduced into opposing first and second surfaces of glass sheet 100.

Figure 9:
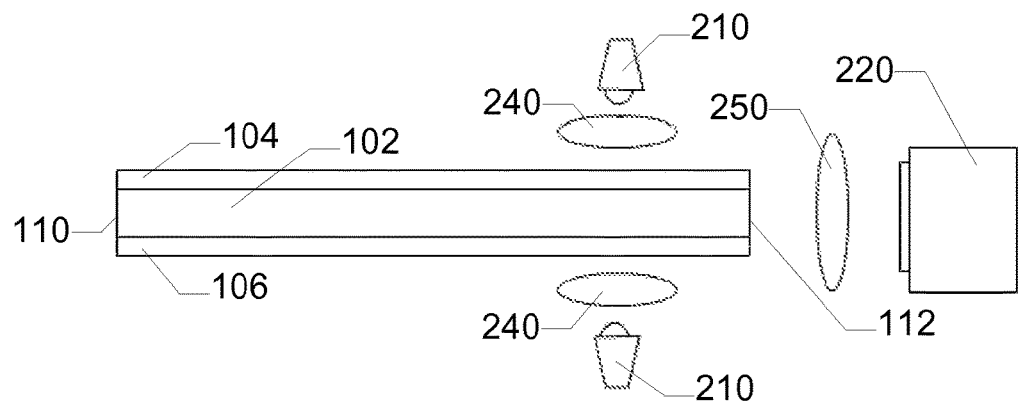
FIG. 9 is a side view of another exemplary embodiment of a thickness measurement system.

FIG. 9 illustrates another exemplary embodiment of a thickness measurement system 200b. Thickness measurement system 200b is similar to thickness measurement system 200 described herein with reference to FIGS. 2-4 and thickness measurement system 200a described herein with reference to FIG. 8. For example, in the embodiment shown in FIG. 9, thickness measurement system 200b comprises light source 210 configured to introduce light into glass sheet 100 and light detector 220 configured to detect light emitted from second edge 212 of the glass sheet. In some embodiments, thickness measurement system 200b comprises diffuser 240 configured to diffuse the light introduced into glass sheet 100 by light source 210. Additionally, or alternatively, thickness measurement system 200b comprises optical unit 250 configured to focus the light emitted from second edge 212 of glass sheet 100 onto light detector 220. In the embodiment shown in FIG. 9, light source 210 is positioned adjacent to a surface of glass sheet 100. Thus, light source 210 is configured to introduce light into the surface of glass sheet 100 as opposed to introducing light into an edge of the glass sheet.

In some embodiments, light source 210 is directed substantially perpendicular to the surface of glass sheet 100 as shown in FIG. 9. For example, light source 210 is positioned between first edge 110 and second edge 112 of glass sheet 100 and directed toward the surface of the glass sheet. In some embodiments, light source 210 emits light that elicits fluorescence within glass sheet 100 (e.g., ultraviolet (UV) light). For example, light source 210 comprises a UV laser. The glass sheet 100 fluoresces in response to the light introduced into the glass sheet by light source 210, and the fluoresced light propagates through the glass sheet and is emitted from second edge 112 as described herein with reference to thickness measurement system 200. In some embodiments, light source 210 comprises two light sources positioned on opposite sides of glass sheet 100 as shown in FIG. 9. Thus, light is introduced into opposing first and second surfaces of glass sheet 100.

In some embodiments, a method comprises detecting light emitted from an edge of a glass article and determining a thickness of a layer of the glass article based on a distance between a first intensity boundary and a second intensity boundary of the emitted light. In some embodiments, the layer of the glass article is a first layer, the glass article comprises a second layer adjacent to the first layer, and the method further comprises determining a thickness of the second layer of the glass article based on a distance between the second intensity boundary of the emitted light and a third intensity boundary of the emitted light. Additionally, or alternatively, the second intensity boundary comprises an intermediate boundary, and at least one of the first intensity boundary or the third intensity boundary comprises an edge boundary. Additionally, or alternatively, the determining the thickness of the layer of the glass article comprises determining the thickness of the layer at a plurality of different transverse positions along the edge of the glass article.

The glass articles described herein can be used for a variety of applications including, for example, for cover glass or glass backplane applications in consumer or commercial electronic devices including, for example, LCD, LED, OLED, and quantum dot displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; for commercial or household appliance applications; for lighting or signage (e.g., static or dynamic signage) applications; or for transportation applications including, for example, rail and aerospace applications.

It will be apparent to those skilled in the art that various modifications and variations can be made without departing from the spirit or scope of the invention. Accordingly, the invention is not to be restricted except in light of the attached claims and their equivalents.

What is claimed:

1. A method comprising:
   (a) introducing light into a glass article such that at least a portion of the introduced light is emitted from an edge of the glass article;
   (b) detecting the light emitted from the edge of the glass article, an intensity profile of the emitted light comprising an intensity of the emitted light as a function of axial position;
   (c) determining a first intensity boundary of the intensity profile and a second intensity boundary of the intensity profile; and
   (d) determining a thickness of a layer of the glass article based on an axial distance between the first intensity boundary and the second intensity boundary,
   wherein the method further comprises determining a thickness profile of the layer of the glass article by repeating steps (b) through (d) at a plurality of different transverse positions along the edge of the glass article, the thickness profile comprising the thickness of the layer of the glass article as a function of transverse position along the edge of the glass article.

2. The method of claim 1, wherein the introducing light into the glass article comprises introducing light into a first edge of the glass article, and the detecting the light emitted from the edge of the glass article comprises detecting the light emitted from a second edge of the glass article opposite the first edge.

3. The method of claim 1, wherein the introducing light into the glass article comprises introducing diffused light into the glass article.

4. The method of claim 1, wherein the introducing light into the glass article comprises positioning a light source adjacent to the glass article and moving the light source relative to the glass article during the detecting the light emitted from the edge of the glass article.

5. The method of claim 1, further comprising moving a light detector relative to the glass article in a transverse direction along the edge of the glass article.

6. The method of claim 1, wherein the layer of the glass article is a first layer, the glass article comprises a second layer adjacent to the first layer, and the method further comprises determining a third intensity boundary of the intensity profile and determining a thickness of the second layer of the glass article based on an axial distance between the second intensity boundary and the third intensity boundary.

7. The method of claim 1, wherein the first intensity boundary comprises a surface boundary.

8. The method of claim 1, wherein the second intensity boundary comprises an intermediate boundary.

9. The method of claim 1, wherein the introducing light into the glass article comprises introducing white light into the glass article.

10. A method comprising:
(a) introducing light into a glass article such that at least a portion of the introduced light is emitted from an edge of the glass article;
(b) detecting the light emitted from the edge of the glass article, an intensity profile of the emitted light comprising an intensity of the emitted light as a function of axial position;
(c) determining an axial position of an intensity boundary of the intensity profile;
(d) repeating steps (b) and (c) at a plurality of different transverse positions along the edge of the glass article to determine axial positions of a plurality of intensity boundaries corresponding to the different transverse positions; and
(e) determining a layer boundary between adjacent first and second layers of the glass article based on the plurality of intensity boundaries,
wherein the first layer of the glass article comprises a first glass composition, and the second layer of the glass article comprises a second glass composition different than the first glass composition.

11. The method of claim 10, further comprising determining a thickness profile of each of the first layer and the second layer of the glass article based on the layer boundary.

12. The method of claim 10, wherein step (d) comprises moving a light detector in a transverse direction relative to the glass article to repeat steps (b) and (c) at the plurality of different transverse positions along the edge of the glass article.

13. The method of claim 10, wherein a refractive index of the first glass composition differs from a refractive index of the second glass composition by at least about 0.001.

* * * * *